(12) United States Patent
Wise et al.

(10) Patent No.: US 10,109,976 B2
(45) Date of Patent: Oct. 23, 2018

(54) DIVIDED PULSE LASERS

(71) Applicant: CORNELL UNIVERSITY, Ithaca, NY (US)

(72) Inventors: Frank W. Wise, Ithaca, NY (US); Erin Stranford Lamb, Ithaca, NY (US); Logan Wright, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/113,349

(22) PCT Filed: Jan. 21, 2015

(86) PCT No.: PCT/US2015/012322
§ 371 (c)(1),
(2) Date: Jul. 21, 2016

(87) PCT Pub. No.: WO2015/134123
PCT Pub. Date: Sep. 11, 2015

(65) Prior Publication Data
US 2016/0352064 A1    Dec. 1, 2016

Related U.S. Application Data

(60) Provisional application No. 61/929,963, filed on Jan. 21, 2014.

(51) Int. Cl.
*H01S 3/067* (2006.01)
*H01S 3/11* (2006.01)
(Continued)

(52) U.S. Cl.
CPC ...... *H01S 3/06712* (2013.01); *H01S 3/06791* (2013.01); *H01S 3/08054* (2013.01);
(Continued)

(58) Field of Classification Search
CPC .............. H01S 3/06712; H01S 3/2333; H01S 3/10046; H01S 3/1618; H01S 3/1118;
(Continued)

(56) References Cited

U.S. PATENT DOCUMENTS

2002/0003650 A1    1/2002 Usami et al.
2004/0160995 A1    8/2004 Sauter et al.
(Continued)

OTHER PUBLICATIONS

Lee, M. J., Authorized Officer, International Search Report and Written Opinion, International Application No. PCT/US2015/012322, dated Nov. 12, 2015, 17 pages.

*Primary Examiner* — Dung Nguyen
(74) *Attorney, Agent, or Firm* — Perkins Coie LLP

(57) ABSTRACT

Methods, systems, and devices are disclosed for divided-pulse lasers. In one aspect, a pulsed laser is provided to include a laser cavity including an optical amplifier and a plurality of optical dividing elements and configured to direct a laser pulse of linearly polarized light into the plurality of optical dividing elements to divide the light of the laser pulse into a sequence of divided pulses each having a pulse energy being a portion of the energy of the laser pulse before entry of the optical dividing elements, to subsequently direct the divided pulses into the optical amplifier to produce amplified divided pulses. The laser cavity is configured to direct the amplified divided pulses back into the plurality of optical dividing elements for a second time in an opposite direction to recombine the amplified divided pulses into a single laser pulse with greater pulse energy as an output pulse of the laser cavity.

35 Claims, 5 Drawing Sheets

(51) Int. Cl.
*H01S 3/16* (2006.01)
*H01S 3/10* (2006.01)
*H01S 3/23* (2006.01)
H01S 3/08 (2006.01)
H01S 3/081 (2006.01)
H01S 3/082 (2006.01)

(52) U.S. Cl.
CPC ........ *H01S 3/10046* (2013.01); *H01S 3/1118* (2013.01); *H01S 3/1618* (2013.01); *H01S 3/2333* (2013.01); *H01S 3/08* (2013.01); *H01S 3/081* (2013.01); *H01S 3/0826* (2013.01); *H01S 2301/085* (2013.01)

(58) Field of Classification Search
CPC ............. H01S 3/08054; H01S 3/06791; H01S 2301/085; H01S 3/081; H01S 3/08
See application file for complete search history.

(56) References Cited

U.S. PATENT DOCUMENTS

| | | | |
|---|---|---|---|
| 2006/0050366 A1 | 3/2006 | Kong et al. | |
| 2009/0168814 A1 | 7/2009 | Achtenhagen | |
| 2010/0142034 A1* | 6/2010 | Wise | H01S 3/0057 359/349 |
| 2012/0002687 A1* | 1/2012 | Ershov | H01S 3/225 372/20 |

* cited by examiner

DIVIDED PULSE LASERS

PRIORITY CLAIM AND RELATED PATENT APPLICATION

This patent document is a 35 U.S.C. § 371 National Stage application of PCT Application No. PCT/US2015/012322, filed on Jan. 21, 2015, entitled "Divided Pulse Lasers," which further claims priority to and the benefits of U.S. Provisional Application No. 61/929,963 entitled "Divided Pulse Lasers," and filed Jan. 21, 2014, the entire contents of each application are incorporated by reference in this document, in their entirety.

STATEMENT REGARDING FEDERALLY SPONSORED RESEARCH OR DEVELOPMENT

This invention was made with government support under Grant No. EB002019 awarded by the National Institutes of Health (NIH) and Grant No. BIS-096749 awarded by the National Science Foundation (NSF). The government has certain rights in the invention.

TECHNICAL FIELD

This patent document relates to systems, devices, and processes for lasers and laser operations.

BACKGROUND

A laser is a device that emits light or electromagnetic radiation with a high degree of spatial and temporal coherence through a process of optical amplification based on the stimulated emission of photons. The laser operation is known as Light Amplification by Stimulated Emission of Radiation. Spatial coherence typically is expressed through the output being a narrow beam which is diffraction-limited. For example, light beams emitted by a laser can be focused to very tiny spots, e.g., achieving a very high irradiance, or be focused into a beam of low divergence and concentrate power at a large distance.

Components of a laser include an energy supply, a gain medium to amplify light by stimulated emission, and an optical feedback mechanism. A laser amplifies light of a specific wavelength through the gain medium, thus increasing power. For the gain medium to amplify light, it needs to be supplied with energy, e.g., by an electrical current, or by another light at a different wavelength. An optical cavity (e.g., a pair of mirrors on either end of the gain medium) can serve as the optical feedback mechanism. For example, light can be directed back and forth between the mirrors, passing through the gain medium while being amplified each time. In some laser designs, one of the two mirrors of the optical cavity (the output coupler) is partially transparent to allow some light to escape through this mirror. The laser light emitted may spread out or form a narrow beam based on the design of the optical cavity.

SUMMARY

Techniques, systems, and devices are disclosed for divided-pulse lasers using dividing elements inside laser cavities to accomplish the coherent division and combination of the sub-pulses.

The subject matter described in this patent document can be implemented in specific ways that provide one or more of the following features. For example, the disclosed divided-pulse laser (DPL) technology provides a route to increasing the output energy of lasers. This may be used to scale the energy of lasers without the use of an external amplifier, e.g., which may provide lower intensity noise than is available from a low power laser and amplifier. This would be of benefit for applications that require low-noise pulse trains, e.g., such as stimulated Raman scattering microscopy. In pulse-burst operation, for example, divided-pulse lasers would be applicable to material processing.

In one aspect, a pulsed laser is provided to include a laser cavity including an optical amplifier and a plurality of optical dividing elements and configured to direct a laser pulse of linearly polarized light into the plurality of optical dividing elements to divide the light of the laser pulse into a sequence of divided pulses each having a pulse energy being a portion of the energy of the laser pulse before entry of the optical dividing elements, to subsequently direct the divided pulses into the optical amplifier to produce amplified divided pulses. The laser cavity is configured to direct the amplified divided pulses back into the plurality of optical dividing elements for a second time in an opposite direction to recombine the amplified divided pulses into a single laser pulse with greater pulse energy as an output pulse of the laser cavity.

In another aspect, a method is provided for operating a pulsed laser and includes, inside a laser cavity, directing a laser pulse of linearly polarized light to divide the light of the laser pulse into a sequence of divided pulses each having a pulse energy being a portion of the energy of the laser pulse before entry of the optical dividing elements; amplifying the divided pulses in an optical amplifier in the laser cavity to produce amplified divided pulses; and recombining the amplified divided pulses into a single laser pulse with greater pulse energy as an output pulse of the laser cavity.

In yet another aspect, a pulsed laser that generates pulse bursts is provided. This pulse laser includes an optical cavity including a laser gain medium for generating laser pulses and a set of optical dividing elements within the optical cavity. The set of optical dividing elements is configured to divide a laser pulse from the laser gain medium into a sequence of temporally spaced sub-pulses each having a lower pulse energy than the laser pulse. The optical cavity directs the sequence of temporally spaced sub-pulses out of the optical cavity as an laser output burst.

In another aspect, a pulsed laser that generates high energy pulses is disclosed. This pulsed laser includes an optical ring cavity including an optical path to allow laser light to circulate inside the optical ring cavity. The pulsed laser includes a set of optical dividing elements and a set of optical recombining elements positioned along the optical path of the optical ring cavity. An optical amplifier is positioned along the optical path of the optical ring cavity between the set of optical dividing elements and the set of optical recombining elements. To operate this pulsed laser as a DPL, the optical ring cavity is configured to direct a laser pulse into the set of optical dividing elements to divide the laser pulse into a sequence of temporally spaced sub-pulses, wherein each sub-pulse has a lower pulse energy than the input laser pulse. The optical ring cavity is also configured to direct the sequence of sub-pulses into the optical amplifier to produce a sequence of amplified sub-pulses, and direct the sequence of amplified sub-pulses into the set of optical recombining elements to recombine the sequence of amplified sub-pulses into a single amplified laser pulse having a greater pulse energy than the laser pulse. The optical ring cavity is further configured to direct a portion of the single amplified laser pulse out of the optical ring cavity as the output pulse of the pulse laser.

In yet another aspect, a pulsed laser that generates high energy pulses is disclosed. This pulsed laser includes a linear optical cavity which includes an optical path. The pulsed laser also includes a set of optical dividing elements and a set of optical recombining elements positioned along the optical path of the linear optical cavity, and an optical amplifier positioned along the optical path of the linear optical cavity between the set of optical dividing elements and the set of optical recombining elements. The linear optical cavity is configured to direct a laser pulse into the set of optical dividing elements to divide the laser pulse into a sequence of temporally spaced sub-pulses, and each sub-pulse has a lower pulse energy than the input laser pulse. The linear optical cavity is also configured to direct the sequence of sub-pulses into the optical amplifier to produce a sequence of amplified sub-pulses, and direct the sequence of amplified sub-pulses into the separate set of optical recombining elements to recombine the sequence of amplified sub-pulses into a single amplified laser pulse having a greater pulse energy than the input laser pulse. The linear optical cavity is further configured to direct a portion of the single amplified laser pulse out of the linear optical cavity as the output pulse of the pulse laser.

The above and other aspects and implementations are described in greater detail in the description, the drawings and the claims.

DETAILED DESCRIPTION

Figure 1:
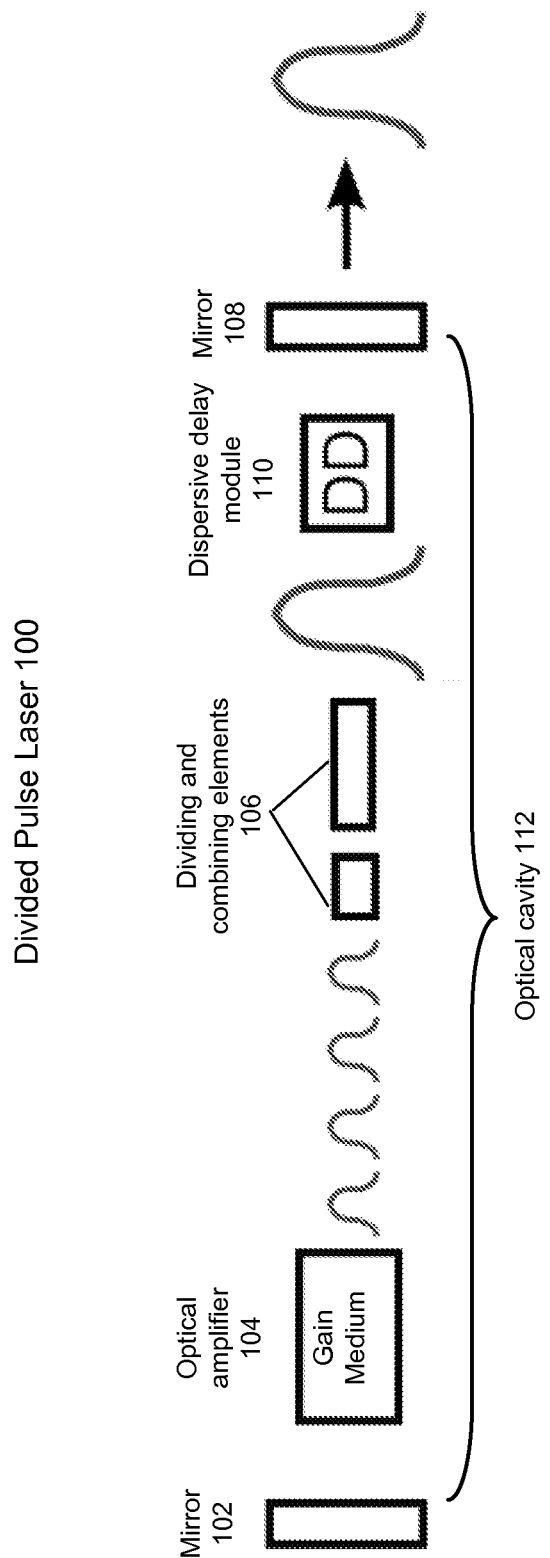
FIG. 1 shows a diagram of an exemplary divided pulse laser based on the disclosed technology.

The pulse energy that can be produced in a picosecond-pulse or femtosecond-pulse laser is limited by several factors, such as nonlinear phase shift accumulation. In some laser implementations, the pulse energy is increased by amplifying externally to the laser cavity. For example, U.S. Pat. No. 8,456,736 B2 to Cornell University discloses a divided-pulse amplification technology for energy scaling implemented in an external amplifier outside a laser, which is incorporated by reference as part of the disclosure of this patent document.

The disclosed techniques, systems, and devices can be used for increasing the pulse energy of a laser by performing pulse division and recombination directly within the laser cavity. In some embodiments, the pulse generated by a short-pulse laser can be divided into a series of sub-pulses of lower energy. The sub-pulses can then be amplified to reach the maximum pulse energy by a proper amplification mechanism, and then the amplified sub-pulses can be recombined to produce a single pulse of higher energy than is possible without pulse division and recombination. The single pulse produced from recombination can then be output from the pulse laser. For example, if a pulse is divided into N sub-pulses, the output pulse energy can be increased by a factor of N.

Specifically, the disclosed divided-pulse lasers include dividing elements inside laser cavities to accomplish both the coherent division and combination of the sub-pulses. Exemplary implementations of an exemplary divided-pulse laser device are described that demonstrate coherent combining of pulses within a laser cavity. Applications of such devices including energy scaling and pulse-burst operation are discussed. For example, it can be shown that such devices can provide at least 16-times enhancement of the pulse energy over a fiber laser in other designs.

Divided pulse amplification (DPA) is a technique that employs temporal division and recombination of pulses which can be used to avert the effects of nonlinearity and to scale pulses to higher energy within amplifiers, such as pulse lasers. For example, when employing DPA with short-pulse lasers, megawatt peak powers in picosecond pulses have been achieved. In combination with chirped pulse amplification (CPA), DPA has been used to achieve gigawatt peak powers in 300 fs pulses. In some examples, pulse division can be used to achieve nonlinear compression at higher peak powers by spectrally broadening the divided pulses before recombination.

The disclosed technology includes a divided pulse laser (DPL), which implements the above-described pulse division concept, including the DPA technique within the laser cavity. Such a DPL device for producing high energy laser pulses can include a laser cavity including an optical amplifier and a plurality of optical dividing elements. The laser cavity is configured to direct the pulse that forms in the laser (which can be linearly-polarized) into the plurality of optical dividing elements to divide the laser pulse into a sequence of divided pulses, each of which having a pulse energy being a portion of the energy of the laser pulse before entering the optical dividing elements. The laser cavity is further configured to subsequently direct the sequence of divided pulses into the optical amplifier to produce amplified divided pulses. This laser cavity is also configured to direct the amplified divided pulses back into the plurality of optical dividing elements for a second time in an opposite direction to recombine the amplified divided pulses into a single laser pulse with greater pulse energy, a portion of which can then be output from the laser cavity.

The disclosed techniques can offer a number of new capabilities and be used in a variety of exemplary applications. FIG. 1 shows a diagram of an exemplary divided pulse laser 100 based on the disclosed technology. In the embodiment shown, DPL 100 includes a first mirror 102, a gain medium (i.e., optical amplifier) 104, and dividing and combining elements 106. In some embodiments, the dividing and combining elements 106 are configured in a double-pass configuration for both pulse dividing and recombining operations. DPL 100 also includes a second mirror 108 and a dispersive delay module (DD) 110, such that the optical cavity 112 is formed between the first mirror 102 and second mirror 108. In some implementations, the dispersive delay module 110 is not included, such as when implementing pulse division in normal-dispersion lasers.

In some conventional short-pulse lasers, the pulse energy is limited by the nonlinear phase shift accumulated in the optical cavity, primarily in the gain medium. Divided pulse laser 100 can be used to mitigate such nonlinear effect to scale and dramatically increase the stable pulse energy based on divided pulse amplification. More specifically, a laser pulse can be divided by dividing and combining elements 106 into a sequence of sub-pulses, which are subsequently amplified by gain medium 104 which produces a desired optical gain. In some implementations, the gain medium 104 may be optically pumped by pump light from an optical pump source, e.g., a pump laser source. In other implementations, the gain medium 104 may be electrically pumped such as a semiconductor optical amplifier that converts electrical energy into optical energy to produce the desired optical gain for the laser. The amplified sub-pulses are recombined into a single pulse of significantly high pulse energy by dividing and combining elements 106 before the single pulse is output from second mirror 108. In some implementations, second mirror 108 is a saturable absorber mirror (SAM). Under this construction, the gain medium 104 and the dividing and combining elements 106 are within the laser cavity formed by mirrors 102 and 108.

In one embodiment of the divided pulse laser 100, an ytterbium (Yb) fiber laser designed to operate in the soliton regime may be constructed.

Figure 2:
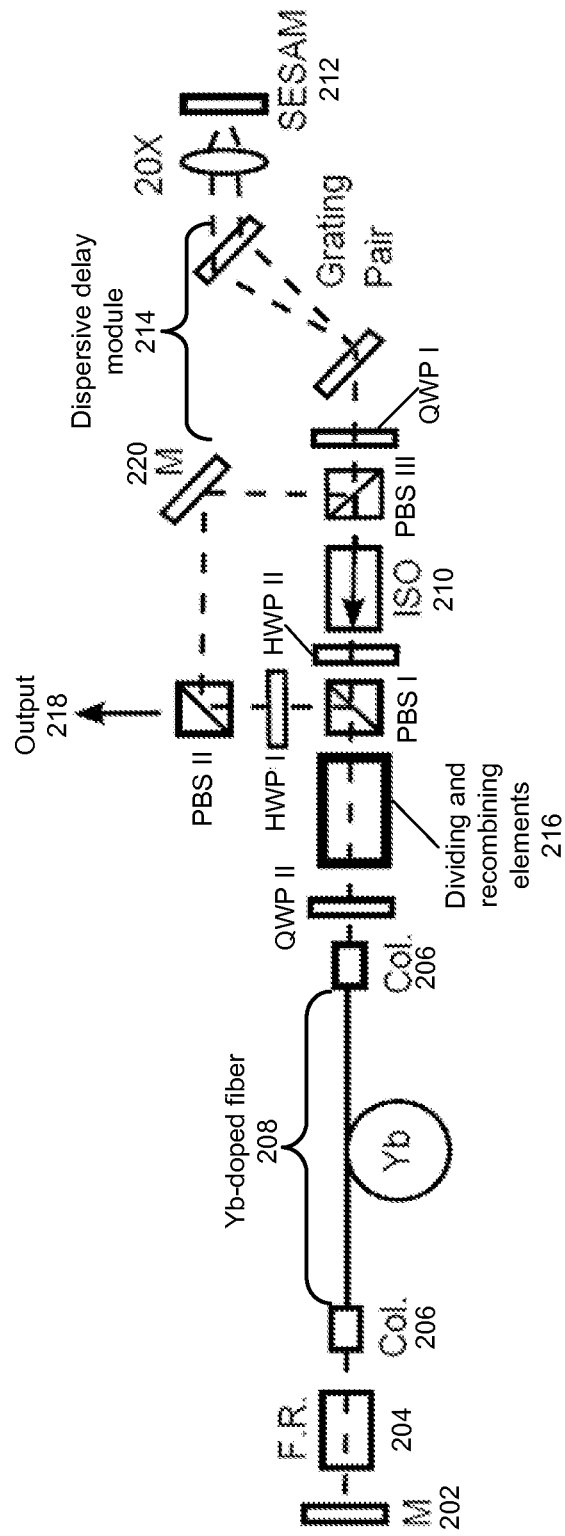
FIG. 2 shows a diagram of an exemplary divided-pulse laser device of the disclosed technology using Yb-doped fiber as the gain medium.

FIG. 2 shows a diagram of an exemplary DPL device 200 using Yb-doped fiber as the gain medium. As shown in FIG. 2, the DPL device 200 includes a mirror (M) 202, a Faraday rotator (F.R.) 204, a collimator (Col.) 206, and an Yb-doped fiber 208 as the gain medium/amplifier. Note that Yb-doped fiber 208 is in a double-pass configuration. DPL device 200 also includes multiple polarizing beam splitters (PBS), including PBS I, PBS II, and PBS III. DPL device 200 additionally includes half-wave plates (HWP), including HWP I and HWP II; and quarter-wave plates (QWP), including QWP I and QWP II. Moreover, DPL device 200 includes an isolator (ISO) 210 and a semiconductor saturable absorber mirror (SESAM) 212. DPL device 200 further includes dispersive delay module 214 for obtaining anomalous dispersion. In the embodiment shown, dispersive delay module 214 is implemented as a grating pair. DPL device 200 also includes dividing and recombining elements 216 comprising a stack of optical birefringent elements such as yttrium vanadate crystals configured in a double-pass through configuration.

Within DPL device 200, a laser pulse of linearly polarized light travels from PBS I into dividing and recombining elements 216 that comprise a stack of optical birefringent elements such as yttrium vanadate crystals. In one embodiment, the axis of the first vanadate crystal (i.e., the rightmost crystal) in the stack of yttrium vanadate crystals is oriented 45 degrees from the polarization axis of the incident light, which causes the laser pulse to divide into two copies of substantially equal magnitude but are separated in time due to the birefringence of the vanadate crystal. Additional vanadate crystals are positioned after the first vanadate crystal to form multiple dividing stages. For example, each crystal stage of the additional vanadate crystals is oriented at 45 degrees from the previous crystal stage (i.e., the adjacent crystal on the right), allowing each pulse to be further divided into two sub-pulses in each successive crystal stage. At the end of a stack of N crystal stages, the number of pulses will be $2^N$. The divided pulses in the optical cavity are then amplified in ytterbium-doped fiber 208 in a double-pass configuration, with Faraday rotator 204 and mirror 202 serving as a retro-reflector and a mechanism to make the laser pulses insensitive to the birefringence of the fiber and thus environmentally stable.

After travelling the double-pass through the amplifying fiber 208, the multiple pulses travelling to the right are recombined by traversing the same stack of dividing and recombining elements 216 in the opposite direction. In some embodiments, at the output of the dividing and recombining elements 216, the re-combined pulse is polarized orthogonally to the input pulse, and thus is reflected upward by PBS I. A half-wave plate HWP I positioned between PBS I and PBS II can serve as a variable output coupler to pass a portion of a recombined pulse as the output pulse 218, which is transmitted through PBS II. The remaining portion of the recombined pulse is reflected by PBS II and routed through a mirror 220 and PBS III (referred to as "the reflected pulse"). The reflected pulse passes through the grating pair that forms the dispersive delay module 214 which provides anomalous dispersion for soliton attraction, and is then focused onto SESAM 212. The pulse is reflected back through the grating pair, and is transmitted through PBS III and the isolator 210 through the use of a quarter-wave plate QWP I. As mentioned above, the use of Faraday rotator 204 results in cancellation of the birefringence of the gain fiber 208. Consequently, by using a SESAM as the saturable absorber, a divided-pulse laser can be environmentally stable. One skilled in the art would recognize that other saturable absorbers (e.g., nonlinear loop mirrors) could also allow the laser to be environmentally stable.

While dividing and recombining elements 216 in DPL device 200 include a stack of birefringent crystals, other implementations of a DPL device can include dividing elements without birefringent crystals, e.g., by replacing birefringent crystals with interferometers. Moreover, the above-describe divided-pulse concept may be implemented in soliton lasers having geometries other than the one shown in FIG. 2. For example, pulse division and recombination within a disclosed DPL device may be used with mode-locking mechanisms other than a soliton, such as dissipative soliton, similariton, etc. In some embodiments, the intra-cavity pulse division mechanisms shown in FIG. 2 may be used to create controllable pulse bursts by taking the output of the laser before the divided pulses have been recombined into a single pulse. The disclosed technique is applicable to DPL devices based on different types gain media, which are not limited to the a fiber gain medium illustrated in FIG. 2. In one example, DPL device 200 can be configured to scale the pulse energy of an Yb-doped fiber soliton laser by a factor of 16.

Without using the pulse division, an exemplary soliton laser was tested to generate 1.4 ps pulses with 0.35 nJ pulse energy. By implementing above-described DPA techniques in a conventional soliton laser, the output pulse energy of a modified soliton laser can be significantly increased. FIGS. 3A-3E show exemplary data plots obtained from an exemplary DPL device including one dividing crystal in the cavity.

Figure 3A:
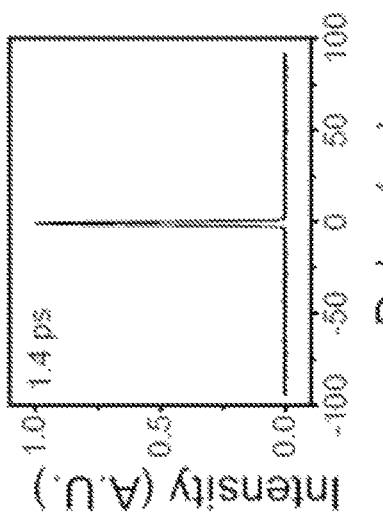
FIG. 3A shows an exemplary spectrum plot of the DPL device output.
Figure 3B:
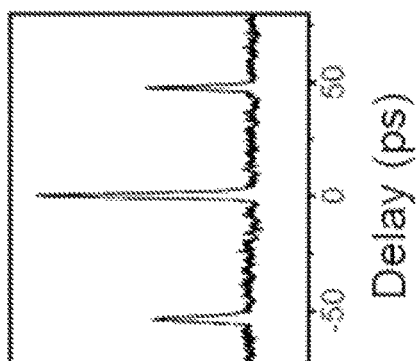
FIG. 3B shows an exemplary autocorrelation measurement plot of the divided pulses generated by one dividing crystal.
Figure 3C:
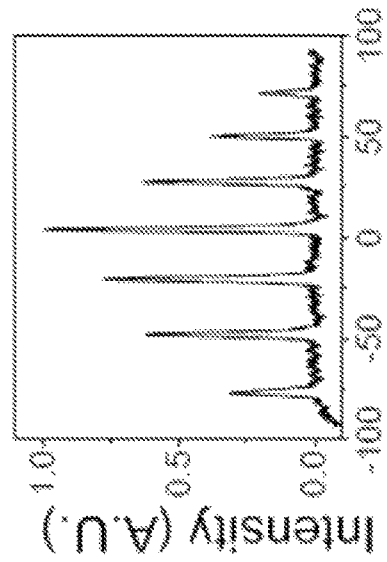
FIG. 3C shows an exemplary autocorrelation measurement plot of a re-combined pulse.

FIG. 3A shows an exemplary spectrum plot of the DPL device output. As can be seen, the maximum stable pulse energy has doubled to 0.7 nJ from 0.35 nJ as a result of dividing and recombining with a single crystal. FIG. 3B shows an exemplary autocorrelation measurement plot of the divided pulses generated by one dividing crystal. The measurement is enabled by leakage of the divided pulses through a cavity mirror, which clearly corresponds to two equal-energy pulses. The 50 ps spacing between the pulses corresponds to the delay expected from a 57.6 mm yttrium vandate crystal. FIG. 3C shows an exemplary autocorrelation measurement plot of a re-combined pulse. As can be seen, the maximum stable pulse energy has doubled to 0.7 nJ from 0.35 nJ pulse energy without pulse division, as expected, while retaining the 1.4 ps duration. Hence, a nearly-perfect recombination of the amplified pulses is achieved.

Figure 3D:
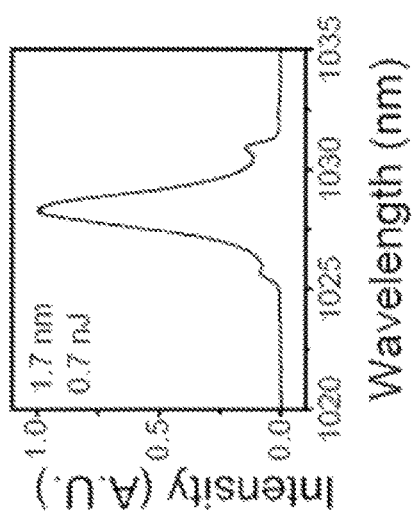
FIG. 3D shows an exemplary autocorrelation trace of recombined pulse from a DPL device with 4 dividing crystals in the dividing elements.

The exemplary results have been scaled to four dividing crystals within the cavity, which yields a factor of 16 increase in the pulse energy, with negligible change in the pulse duration. FIG. 3D shows an exemplary autocorrelation trace of recombined pulse from a DPL device with 4 dividing crystals in the dividing elements. In this example, 6.3 nJ pulse energy has been generated by a soliton laser with ordinary single-mode fiber, as shown in FIG. 3D. Also can be observed in FIG. 3D are residual pulses due to imperfect recombination, which can be reduced through design adjustments.

Figure 3E:
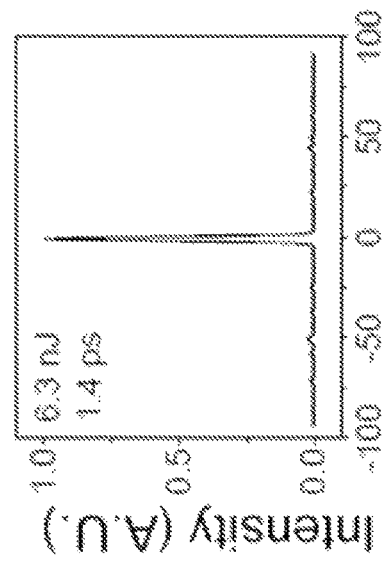
FIG. 3E shows an exemplary autocorrelation trace from a DPL device with two dividing crystals in the dividing elements, representing pulse burst operation.

The disclosed DPL techniques can be used to generate controllable pulse bursts, which are desirable for certain applications, such as material processing. The number of pulses in the burst can be controlled by the number of dividing elements. Bursts of substantially equal-energy pulses can be generated by simply taking the divided pulses as the output. FIG. 3E shows an exemplary autocorrelation trace from a DPL device with two dividing crystals in the dividing elements, representing pulse burst operation. As shown in FIG. 3E, there are four pulses generated by two dividing elements. In some embodiments, the dividing/recombining elements can be adjusted to modulate the pulse burst.

For example, a pulsed laser for generating pulse bursts can be configured to include an optical cavity as a laser resonator for laser pulse generation and includes a laser gain medium within the laser resonator for generating laser pulses and a set of optical dividing elements within the laser resonator to divide each laser pulse into a sequence of sub-pulses as a laser burst. This laser burst with a sequence of sub-pulses is output out of the laser resonator as the output laser burst without being recombined back into a single pulse as described in other examples. In one implementation, the laser burst with the sequence of sub-pulses produced by the set of optical dividing elements within the laser resonator can be coupled out of the laser resonator without being amplified within the laser resonator. In another implementation, the laser burst with the sequence of sub-pulses produced by the set of optical dividing elements within the laser resonator can be directed to pass through the laser gain medium within the laser resonator to be further amplified before being output out of the laser resonator. The laser resonator can be in various optical resonator configurations, such as a linear resonator with two mirrors or a ring resonator.

In the exemplary systems used to generate data plots shown in FIGS. 3A-3E, a Faraday rotator is used as the retroreflector, so that the optical cavity is insensitive to the birefringence of the gain fiber, and a SESAM is used as the saturable absorber, so that the optical cavity is environmentally stable. Moreover, the same dividing elements can also be used as the recombining elements. While the results are shown for 2×, 4× and 16× pulse energy scaling, other energy scaling greater than 16× of a soliton laser is possible.

Figure 4:
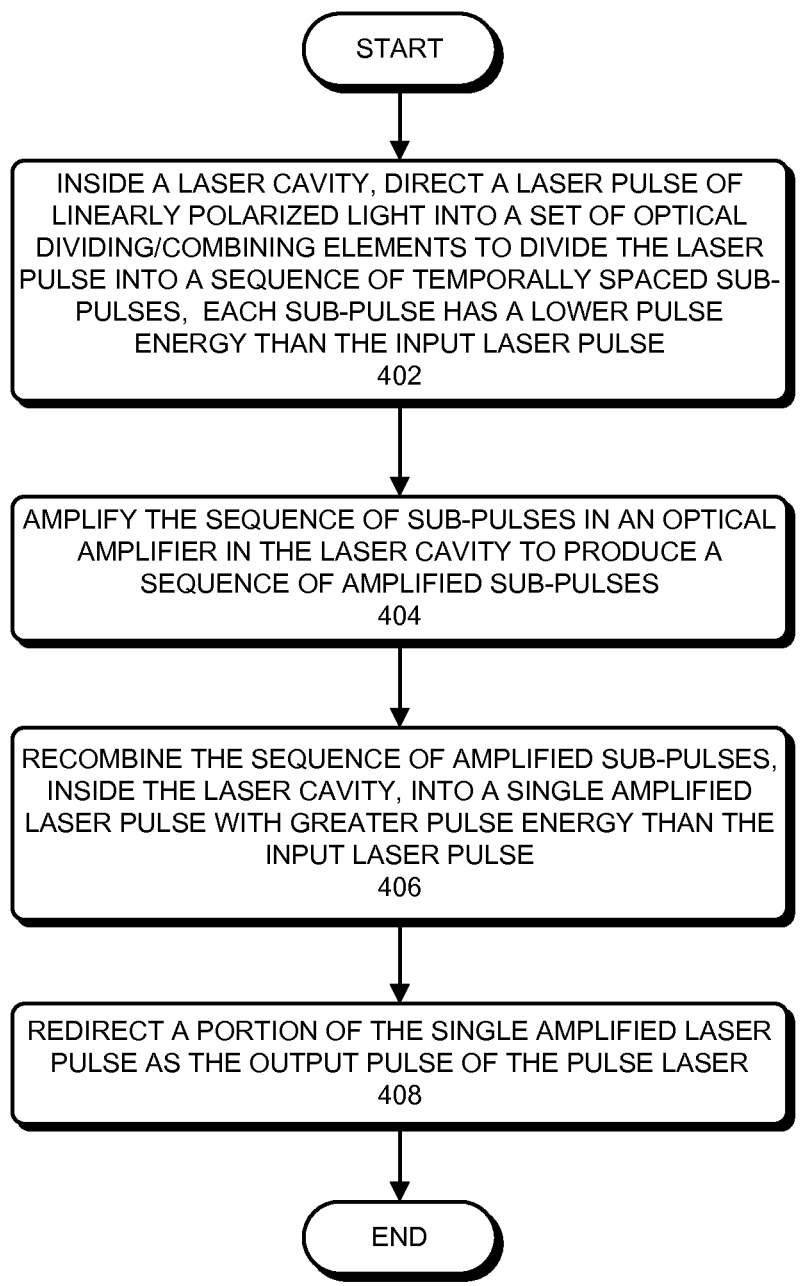
FIG. 4 presents a flowchart illustrating an exemplary process for operating a pulse laser to generate high energy pulses.

FIG. 4 presents a flowchart illustrating an exemplary process for operating a pulse laser to generate high energy pulses. This process includes, inside a laser cavity, directing a laser pulse of linearly polarized light into a set of optical dividing/combining elements to divide the laser pulse into a sequence of temporally spaced sub-pulses, wherein each sub-pulse has a lower pulse energy than the input laser pulse (402). In some embodiments, the set of optical dividing/combining elements are arranged as a set of successive dividing stages along the light path so that the input laser pulse is divided in each successive dividing stage. In some embodiments, the set of optical dividing/combining elements include yttrium vanadate crystals. The process then amplifies the sequence of sub-pulses in an optical amplifier in the laser cavity to produce a sequence of amplified sub-pulses (404). In some embodiments, the optical amplifier includes a ytterbium-doped fiber configured in a double-pass configuration, and the sequence of sub-pulses are directed to pass through the fiber once in each direction, whereby the sequence of sub-pulses are amplified twice through the fiber. Next, the process recombines the sequence of amplified sub-pulses, inside the laser cavity, into a single amplified laser pulse with greater pulse energy than the input laser pulse (step 406). In some embodiments, recombining the sequence of amplified sub-pulses includes directing the sequence of amplified sub-pulses into the same set of optical dividing/combining elements in the opposite direction to the dividing process. The process then redirects a portion of the single amplified laser pulse as the output pulse of the pulse laser (408).

The specific examples in FIG. 2 and FIG. 3 are based on DPL devices having linear optical cavities. The disclosed DPL technology can be applied to pulse lasers having optical cavities or resonators in other cavity configurations, such as ring cavities or pulse lasers having a cavity that is partially linear and partially ring or a cavity having a shape like Greek letter signma. In DPL devices using optical ring cavities, the optical dividing elements and optical recombining elements can be two separate sets of optical elements within an optical ring cavity or resonator.

Figure 5:
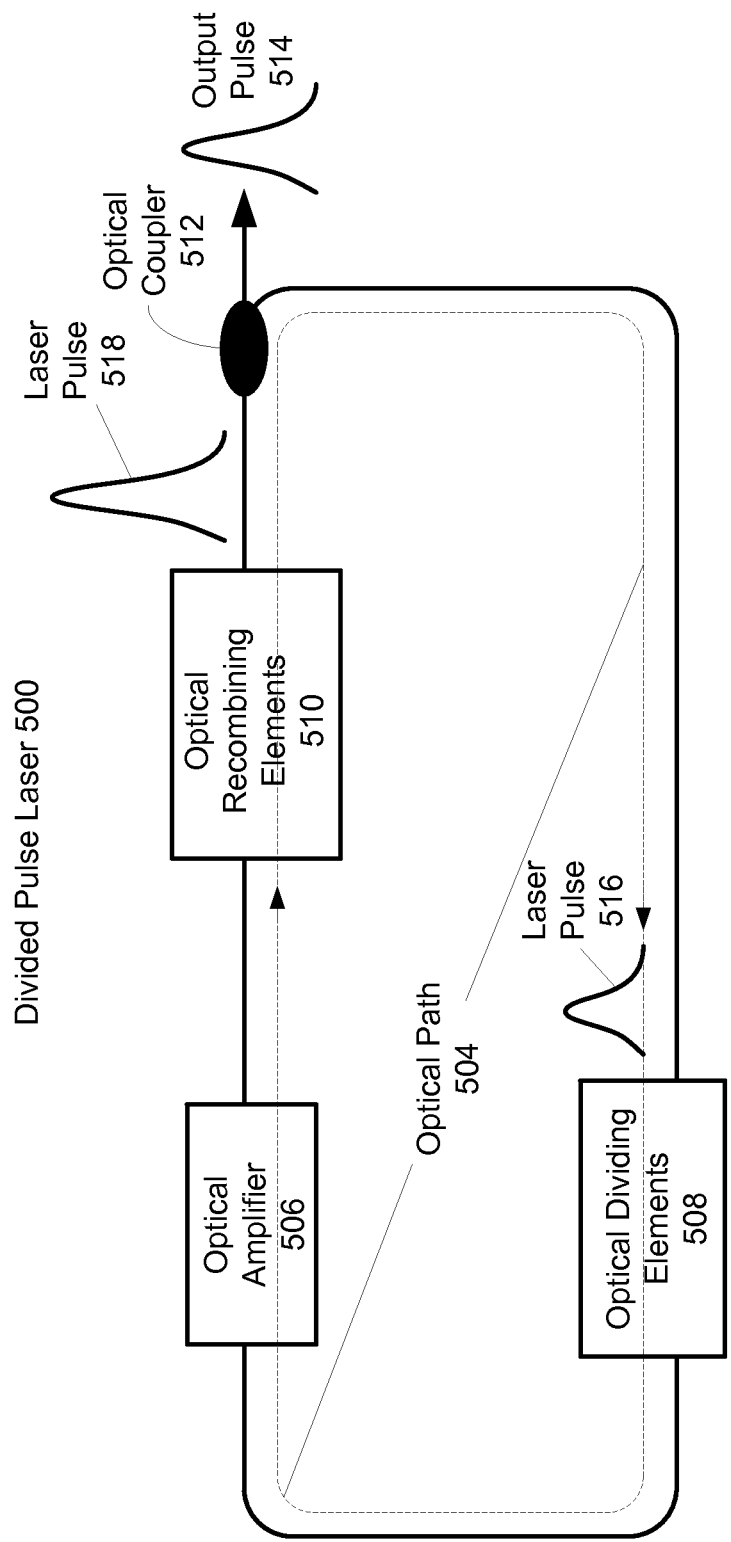
FIG. 5 shows a diagram of an exemplary DPL having a ring cavity.

FIG. 5 shows an example of a DPL 500 having a ring cavity for laser operation. The DPL 500 includes an optical ring cavity as a laser resonator having a laser gain medium 506 in the optical ring cavity. The ring cavity has a closed optical loop labeled as optical path 504 to allow laser light to circulate inside the ring cavity, an optical amplifier 506 as the laser gain medium, a set of optical dividing elements 508, and a set of optical recombination elements 510 which are separated from the set of optical dividing elements 508. DPL 500 also includes an optical coupler 512 to output a portion of circulating laser pulse as the output pulse 514 of the DPL 500. In implementations, DPL 500 can include various other optical elements, which are not explicitly shown in FIG. 5.

To operate ring cavity DPL 500, laser light generated in the ring cavity as represented by a laser pulse 516 is guided into the set of optical dividing elements 508 to divide each laser pulse into a sequence of temporally spaced sub-pulses. Each sub-pulse has a lower pulse energy than the original laser pulse 516 before the pulse division. This sequence of sub-pulses are directed into the optical amplifier 506 to produce a sequence of amplified sub-pulses. Next, the sequence of amplified sub-pulses are directed into the set of optical recombining elements 510 to recombine the sequence of amplified sub-pulses into a single amplified laser pulse 518 having a greater pulse energy than the laser pulse 516. Amplified laser pulse 518 is then partially coupled out of the ring laser cavity as the output pulse 514.

In another aspect, the specific DPL device examples in FIG. 2 and FIG. 3 are based on linear cavities in a double-pass configuration where laser pulses travel back and forth through the same set of optical elements for both pulse division and recombination operations. In other implementations, the disclosed DPL technology can also use linear cavity pulse lasers which use separate sets of optical dividing elements and optical recombination elements. For example, the optical dividing elements and optical recombining elements can be two separate sets of optical elements. Such a DPL device can include an optical amplifier positioned along the optical path of the linear optical cavity between the set of optical dividing elements and the set of optical combining elements. To operate such a linear cavity DPL device, a laser pulse is guided into the set of optical dividing elements to divide the laser pulse into a sequence of temporally spaced sub-pulses, and each sub-pulse has a lower pulse energy than the input laser pulse. Then, the sequence of sub-pulses are directed into the optical amplifier to produce a sequence of amplified sub-pulses. Next, the sequence of amplified sub-pulses are directed into the separate set of optical recombining elements to recombine the sequence of amplified sub-pulses into a single amplified laser pulse having a greater pulse energy than the input laser pulse. The DPL device also include optical elements to output a portion of the single amplified laser pulse as the output pulse of the DPL device. In some embodiments, the laser pulse travels from the set of optical dividing elements to the set of optical recombining elements in the same direction.

Various embodiments of the disclosed technology use intra-cavity pulse division and recombination to provide energy scaling of a short-pulse laser, such as a soliton laser. More specifically, the disclosed DPL technology uses dividing elements within a laser cavity to divide a pulse into sub-pulse before propagation through material, where non-linear phase is accumulated, and then coherently re-combine the resulting sub-pulses after amplification and before the output coupling. This technique allows the output pulse energy available without pulse division and recombination to be multiplied by the number of sub-pulses, thus achieving higher pulse energies than are available without this technique.

The described pulse division technique can be applied to other pulse evolutions along an optical path within the laser cavity, such as dissipative solitons or self-similar pulses, among others. This technique is compatible with other energy-scaling techniques used in fiber gain media, such as scaling of the core size. The described pulse division technique can be applied to other gain media, for example, in solid-state gain media. When implemented in high power fiber or solid-state lasers, the DPL technology can enable extremely high energies directly from the oscillators. Moreover, the disclosed DPL technology can offer advantages of simplicity and reduced noise compared to the alternative techniques of a standard laser and amplifier designed to reach the same pulse energy.

The disclosed DPL technology provides a path to increasing the output energy of lasers. This technology can be used to scale the energy of lasers without the use of an external amplifier, which can achieve lower intensity noise than is available from a low power laser and amplifier. This technology can be beneficial for applications that require low-noise pulse trains, such as stimulated Raman scattering microscopy. When used in a pulse-burst operation mode, the disclosed divided-pulse lasers can be used for material processing.

While this patent document contain many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A pulsed laser that generates high energy pulses by dividing laser pulses and recombining laser pulses within a laser cavity, comprising:
   an optical cavity including a first mirror, and a second mirror to direct light to travel between the first mirror and the second mirror;
   a set of optical dividing/combining elements positioned between the first mirror and the second mirror within the optical cavity and having a first side and second side;
   an optical amplifier positioned within the optical cavity on the second side of the set of optical dividing/combining elements;
   wherein the optical cavity is configured to:
   direct a laser pulse of linearly polarized light into the set of optical dividing/combining elements from the first side to divide the laser pulse into a sequence of temporally spaced sub-pulses, wherein each sub-pulse has a lower pulse energy than an input laser pulse; and
   direct the sequence of sub-pulses into the optical amplifier to produce a sequence of amplified sub-pulses;
   wherein the first mirror is configured to direct the sequence of amplified sub-pulses back into the set of optical dividing/combining elements from the second side to recombine the sequence of amplified sub-pulses into a single amplified laser pulse having a greater pulse energy than the laser pulse; and
   wherein the optical cavity is configured to output a portion of the single amplified laser pulse as the output pulse of the pulsed laser.

2. The pulsed laser of claim 1, wherein each of the set of optical dividing/combining elements is configured to divide an input pulse into two temporally spaced sub-pulses in a first direction from the first side to the second side and combine two input pulses into a single pulse in a second direction from the second side to the first side.

3. The pulsed laser of claim 1, wherein the pulsed laser is a soliton laser that includes a dispersive delay module for providing anomalous dispersion.

4. The pulsed laser of claim 3, wherein the dispersive delay module includes a grating pair.

5. The pulsed laser of claim 1, wherein the second mirror is saturable absorber mirror (SAM).

6. The pulsed laser of claim 5, wherein the second mirror is semiconductor saturable absorber mirror (SESAM).

7. The pulsed laser of claim 1, wherein the optical amplifier includes a fiber gain medium.

8. The pulsed laser of claim 7, wherein the fiber gain medium includes a ytterbium (Yb)-doped fiber.

9. The pulsed laser of claim 7, wherein the optical cavity includes a Faraday rotator positioned between the first mirror and the fiber gain medium.

10. The pulsed laser of claim 9, wherein the Faraday rotator and the first mirror together serve as a retro-reflector and are configured to cancel an effect due to a birefringence of the fiber gain medium.

11. The pulsed laser of claim 1, wherein the optical dividing/combining elements include yttrium vanadate crystals.

12. The pulsed laser of claim 1, wherein the set of optical dividing/combining elements are arranged as a set of successive dividing stages along the light path, and the input laser pulse is divided in each successive dividing stage.

13. The pulsed laser of claim 1, wherein the optical amplifier is in a double-pass configuration to pass and amplify the sequence of sub-pulses once in each direction.

14. The pulsed laser of claim 1, wherein the single amplified laser pulse at the first side of the set of optical dividing/combining elements is polarized substantially orthogonal to the polarization of the input laser.

15. The pulsed laser of claim 1, wherein the number of pulses in the sequence of sub-pulses is N, and the number of elements in the set of optical dividing/combining elements is M, wherein $N=2^M$.

16. The pulsed laser of claim 1, wherein the pulse energy of the single amplified laser pulse is $2^M \times$ of the pulse energy of the input laser pulse.

17. A method for operating a pulsed laser by dividing laser pulses and recombining laser pulses within a laser cavity, comprising:
inside a laser cavity, directing a laser pulse of linearly polarized light to divide the laser pulse into a sequence of temporally spaced sub-pulses, wherein each sub-pulse has a lower pulse energy than an input laser pulse;
amplifying the sequence of sub-pulses in an optical amplifier in the laser cavity to produce a sequence of amplified sub-pulses; and
recombining, inside the laser cavity, the sequence of amplified sub-pulses into a single amplified laser pulse with a greater pulse energy than the input laser pulse; and
redirecting a portion of the single amplified laser pulse as the output pulse of the pulsed laser.

18. The method as in claim 17, wherein the single amplified laser pulse is polarized orthogonally to the input laser pulse.

19. The method as in claim 17, comprising using a set of optical dividing/combining elements inside the laser cavity to divide the laser pulse into the sequence of temporally spaced sub-pulses.

20. The method as in claim 17, wherein the set of optical dividing/combining elements include yttrium vanadate crystals.

21. The method as in claim 17, wherein the set of optical dividing/combining elements are arranged as a set of successive dividing stages along the light path, so that the input laser pulse is divided in each successive dividing stage.

22. The method as in claim 17, wherein the optical amplifier includes a ytterbium-doped fiber configured in a double-pass configuration, and wherein amplifying the sequence of sub-pulses includes directing the sequence of sub-pulses to pass through the fiber once in each direction, thereby amplifying sequence of sub-pulses twice through the fiber.

23. A method for operating a pulsed laser by dividing laser pulses and recombining laser pulses within a laser cavity, comprising:
inside a laser cavity, directing a laser pulse of linearly polarized light to divide the laser pulse into a sequence of temporally spaced sub-pulses, wherein each sub-pulse has a lower pulse energy than an input laser pulse;
amplifying the sequence of sub-pulses in an optical amplifier in the laser cavity to produce a sequence of amplified sub-pulses; and
recombining, inside the laser cavity, the sequence of amplified sub-pulses into a single amplified laser pulse with a greater pulse energy than the input laser pulse; and
redirecting a portion of the single amplified laser pulse as the output pulse of the pulsed laser
wherein recombining the sequence of amplified sub-pulses includes directing the sequence of amplified sub-pulses into the same set of optical dividing/combining elements in the opposite direction to the dividing process.

24. The method as in claim 23, wherein the single amplified laser pulse is polarized orthogonally to the input laser pulse.

25. The method as in claim 23, wherein the set of optical dividing/combining elements are arranged as a set of successive dividing stages along the light path, so that the input laser pulse is divided in each successive dividing stage.

26. The method as in claim 23, wherein the optical amplifier includes a ytterbium-doped fiber configured in a double-pass configuration, and wherein amplifying the sequence of sub-pulses includes directing the sequence of sub-pulses to pass through the fiber once in each direction, thereby amplifying sequence of sub-pulses twice through the fiber.

27. A pulsed laser, comprising:
a laser cavity including an optical amplifier and a plurality of optical dividing elements and configured to direct a laser pulse of linearly polarized light into the plurality of optical dividing elements to divide the light of the laser pulse into a sequence of divided pulses each having a pulse energy being a portion of the energy of the laser pulse before entry of the optical dividing elements, to subsequently direct the divided pulses into the optical amplifier to produce amplified divided pulses,
wherein the laser cavity is configured to direct the amplified divided pulses back into the plurality of optical dividing elements for a second time in an opposite direction to recombine the amplified divided pulses into a single laser pulse with a greater pulse energy as an output pulse of the laser cavity.

28. The pulsed laser as in claim 27, wherein the laser cavity is a fiber laser cavity having a segment of gain fiber as the optical amplifier.

29. The pulsed laser as in claim 27, wherein the laser cavity includes a dispersive delay module.

30. A pulsed laser that generates high energy pulses, comprising:
- an optical ring cavity including an optical path to allow laser light to circulate inside the optical ring cavity;
- a set of optical dividing elements and a set of optical recombining elements positioned along the optical path of the optical ring cavity; and
- an optical amplifier positioned along the optical path of the optical ring cavity between the set of optical dividing elements and the set of optical recombining elements;
- wherein the optical ring cavity is configured to:
  - direct a laser pulse into the set of optical dividing elements to divide the laser pulse into a sequence of temporally spaced sub-pulses, wherein each sub-pulse has a lower pulse energy than an input laser pulse;
  - direct the sequence of sub-pulses into the optical amplifier to produce a sequence of amplified sub-pulses;
  - direct the sequence of amplified sub-pulses into the set of optical recombining elements to recombine the sequence of amplified sub-pulses into a single amplified laser pulse having a greater pulse energy than the laser pulse; and
  - direct a portion of the single amplified laser pulse out of the optical ring cavity as an output pulse of the pulsed laser.

31. The pulse laser of claim 30, wherein the optical ring cavity includes an optical coupler configured to couple the portion of the single amplified laser pulse as the output pulse of the pulse laser.

32. The pulse laser of claim 30, wherein the laser pulse is linearly polarized.

33. A pulsed laser that generates high energy pulses, comprising:
- a linear optical cavity including an optical path;
- a set of optical dividing elements and a set of optical recombining elements positioned along the optical path of the linear optical cavity; and
- an optical amplifier positioned along the optical path of the linear optical cavity between the set of optical dividing elements and the set of optical recombining elements;
- wherein the linear optical cavity is configured to:
  - direct a laser pulse into the set of optical dividing elements to divide the laser pulse into a sequence of temporally spaced sub-pulses, wherein each sub-pulse has a lower pulse energy than an input laser pulse;
  - direct the sequence of sub-pulses into the optical amplifier to produce a sequence of amplified sub-pulses;
  - direct the sequence of amplified sub-pulses into the set of optical recombining elements to recombine the sequence of amplified sub-pulses into a single amplified laser pulse having a greater pulse energy than the laser pulse; and
  - direct a portion of the single amplified laser pulse out of the linear optical cavity as an output pulse of the pulsed laser.

34. The pulsed laser of claim 33, wherein the laser pulse travels from the set of optical dividing elements to the set of optical recombining elements in the same direction.

35. The pulse laser of claim 33, wherein the laser pulse is linearly polarized.

* * * * *